UNITED STATES PATENT OFFICE.

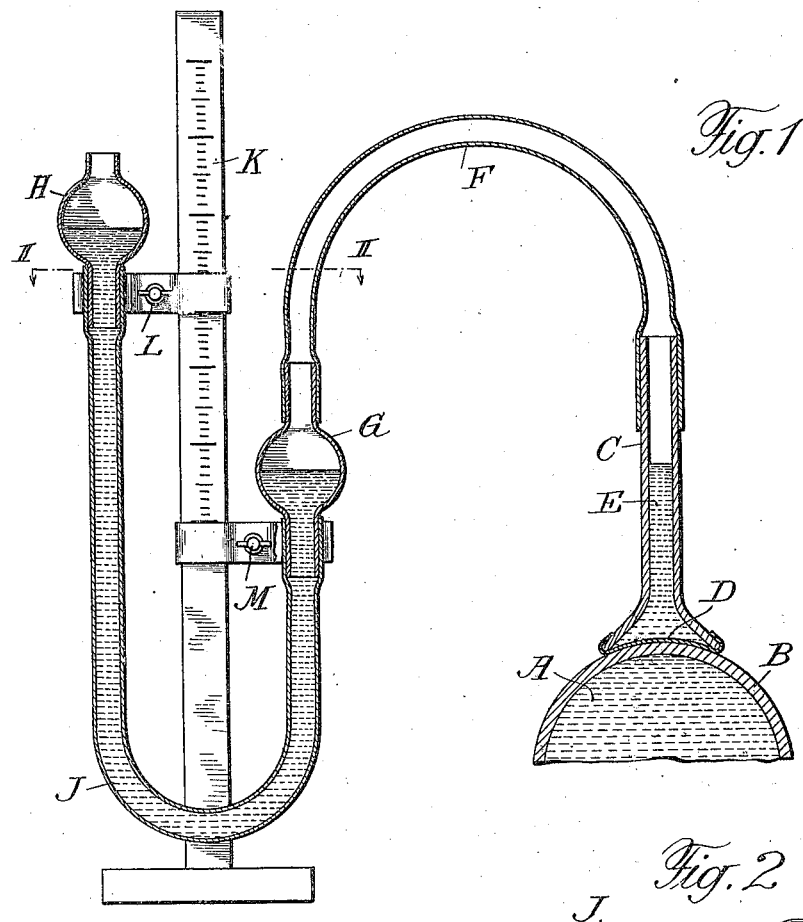

ALFRED AMSLER, OF SCHAFFHAUSEN, SWITZERLAND.

TONOMETER.

1,423,293.      Specification of Letters Patent.      Patented July 18, 1922.

Application filed May 31, 1921. Serial No. 474,010.

*To all whom it may concern:*

Be it known that I, ALFRED AMSLER, a citizen of the Republic of Switzerland, residing at Schaffhausen, Switzerland, have invented certain new and useful Improvements in Tonometers; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to improvements in tonometers, i. e. in instruments for measuring the internal pressure in vessels or chambers filled with liquid or gases, especially for measuring a constant non-pulsating pressure within vessels of human or animal organism, for example, within the eyes, and the like, by bringing the instrument into contact with the outside of the vessel, the membrane of which must be flexible at the place where the measure is to be taken and this measure is the more accurate the more flexible this place is.

It is not absolutely necessary for that purpose that such an instrument, hereinafter called a "hydrostatic tonometer," should be brought directly into contact with the vessel, but the latter may have additional skins or layers superimposed on the place of contact as long as they are yielding enough to form a flexible membrane; for instance the pressure on the eye may also be measured on the closed eye-lid, so that it is not necessary to make the eye insensible.

According to this invention, the hydrostatic tonometer comprises a contact piece consisting of a tube funnel shaped at one end filled with liquid, said end of the tube being pressed in contact with the flexible membrane of the vessel whose constant internal pressure is to be measured; arranged to act on the liquid in the tube of the contact-piece is a readily variable and measurable pressure coming from the direction of the other end to the tube, whereby the membrane of a vessel whose constant internal pressure is to be measured is pressed or driven into the funnel-shaped end of the contact-piece as long as the pressure of the liquid therein is lower than that which exists in the vessel, and is pressed out of the vessel when the pressure in the tube is higher than that in the vessel, whereas at the moment when the pressure on both sides is equal the membrane will begin to flatten out, which moment and the indication of the pressure prevailing in the contact-piece tube directly on the membrane should be observed, the pressure being now equal to the pressure within the membrane.

Instead of bringing the one end or opening of the contact-piece in direct contact with the membrane of the vessel, whereby the latter prevents the outflow of the liquid from the contact-piece, the mouth of the same may be covered by a diaphragm which secures a smooth adaptation of the contact-piece to the vessel and which diaphragm will follow the movements of the membrane of the vessel on its bending in or bending out.

If the contact tube is only partially filled with liquid, the height of the liquid column in the contact-piece may be observed at the moment when the deformation or flattening out of the membrane of the vessel takes place. If the membrane of the vessel bends inwards the liquid column in the contact-piece will sink, on the membrane of the vessel bending outwards the liquid column will rise again. The deformation of the membrane of the vessel is thereby shown by the movement of the liquid column. The bending-in or bending out starts with the flattening out of the membrane of the vessel at the moment when equal pressure exists within and without the membrane and will be observed by the development of the flat surface on the membrane. Should there be an excess pressure on the one or the other side of the membrane no flat surface on the membrane would appear provided that no undue stiffness in the membrane exists. The size of the surface of the flat part of the membrane is thereby of no consequence.

The pressure in the contact tube will be introduced from without as a continuously variable pressure, viz, continuously increasing or continuously decreasing and the amount of pressure can be read at any moment. This may be suitably achieved by introducing a gas or a liquid which does not mix with the liquid column in the contact piece tube. The introduced pressure, increased by the pressure produced from the liquid column itself, will then be equal to the external pressure upon membrane of the vessel.

By reading the height of the liquid in the contact-piece tube at the moment when no movement of the liquid column is observed, as well as the amount of introduced pressure, the internal pressure in the vessel may be ascertained, with an accuracy which will be increased according to the flexibility of the membrane of the vessel.

A suitable device for effecting the increase and decrease of the pressure in the contact-piece consists advantageously of the two communicating containers, the one being fixed and connected with the contact piece by an air-filled tube, while the other container is arranged so as to be slidable up and down a vertical scale, whereby the contents of the lower container can be varied until the counter pressure in the contact tube is equalized by the pressure of the liquid column between the two containers.

The accompanying drawing shows an example of the construction in which:

Fig. 1 shows a vertical section through the hydrostatic tonometer,

Fig. 2 is a section along line II—II of Fig. 1;

Fig. 3 is a section through the contact piece, in contact with the vessel showing the membrane as bent in.

Fig. 4 is a section similar to Fig. 3 showing the membrane of the vessel as partly flattened out.

In Fig. 1 of the drawing A indicates a part of the vessel in section, the pressure of which is to be measured. B is the wall of the vessel, consisting of a flexible membrane which presses the diaphragm D inwards into the tube. C is a funnel-shaped contact tube. E is the liquid-column in the contact tube C. F is a tube for connecting the outer end of the contact tube C with the fixed container G of the pressure device. The movable container H of the pressure device is connected with the container G by means of a tube J. The containers G and H are supported by clamps L and M detachably secured to a stand provided with a scale K. The container H may be moved along a scale K whereby a quantity of liquid will run from one container to the other. The air pressure in the tube F is always equal to the pressure of the liquid column between the containers H and G. The tube F can also be filled either with the same or another liquid as that in H and G instead of with air, but must be incapable of mixing with the liquid forming the column E, so that its height may always be clearly readable.

Fig. 1 shows the membrane of the vessel in a position where the pressure in the contact piece is lower than the pressure in the vessel.

Fig. 3 shows the membrane of the vessel in a bent-in position whereby the pressure in the contact-piece is higher than the internal pressure in the vessel.

Fig. 4 shows the membrane of the vessel in the position where a flat surface has been formed on the membrane showing that an equal pressure exists in the vessel and in the contact-piece.

I claim:

1. In a hydrostatic tonometer adapted to measure the constant internal pressure in vessels having flexible walls, such as the eyes, the combination of a tubular contact piece, a flexible diaphragm at one end thereof and a liquid in said tube the level of which is visible from the outside, means to apply a continuously variable and measurable fluid pressure over the liquid level in said contact piece until the pressures on both sides of the diaphragm are equal, the moment of said equalization of pressures being ascertained by a sudden change of the liquid level occurring in said tube upon the previously bulged in diaphragm beginning to flatten, and means to indicate the exact amount of the pressure acting upon the diaphragm at the moment of equalization of the pressures.

2. In a hydrostatic tonometer, adapted to measure the constant internal pressure in vessels having flexible walls such as the eyes, the combination of a transparent tubular contact piece having a funnel shaped end and filled with a liquid, a flexible diaphragm fitted to said funnel shaped end, two intercommunicating containers filled with liquid, a tube filled with a gaseous fluid connected to one of said containers and to the free end of the contact-piece, a scale, the other container being slidable along said scale for varying the liquid levels in the two containers to generate a pressure above the diaphragm that equalizes the pressure in the vessel, the moment of equalization between said pressure being ascertained by a sudden change of the liquid level occurring in said contact piece due to the flattening of the previously bulged in diaphragm.

In testimony that I claim the foregoing as my invention, I have signed my name.

ALFRED AMSLER.